United States Patent [19]
Fahlstrom et al.

[11] 3,856,506
[45] Dec. 24, 1974

[54] METHOD OF ROASTING FINE GRANULAR SULPHIDE MATERIAL IN FLUIDIZED BED FURNACES

[75] Inventors: Per Anders Herman Henningsson Fahlstrom, Boliden; Karl Goran Gorling, Lidingo, both of Sweden

[73] Assignee: Boliden Aktiebolag, Stockholm, Sweden

[22] Filed: Oct. 26, 1973

[21] Appl. No.: 409,932

Related U.S. Application Data

[63] Continuation of Ser. No. 126,314, March 19, 1971, abandoned, which is a continuation of Ser. No. 739,222, June 24, 1968, abandoned.

[52] U.S. Cl. ............................................. 75/3, 75/9
[51] Int. Cl. ......................... C21b 1/20, C22b 1/10
[58] Field of Search ..................................... 75/3, 9

[56] References Cited
UNITED STATES PATENTS

| | | | |
|---|---|---|---|
| 894,799 | 7/1908 | Ricketts et al. | 75/3 |
| 1,073,381 | 9/1913 | Walle et al. | 75/3 |
| 2,131,006 | 9/1938 | Dean | 75/3 |
| 2,287,663 | 6/1942 | Brassert | 75/3 |
| 2,391,588 | 12/1945 | Naratil | 75/3 |
| 2,766,109 | 10/1956 | Komarek et al. | 75/3 |
| 3,027,251 | 3/1962 | Schaefer et al. | 75/3 |
| 3,094,409 | 6/1963 | Renzoni et al. | 75/9 |
| 3,150,959 | 9/1964 | Wraith | 75/9 |
| 3,346,364 | 10/1967 | Warnes | 75/9 X |
| 3,420,453 | 1/1969 | Tada et al. | 75/3 |

FOREIGN PATENTS OR APPLICATIONS

| | | | |
|---|---|---|---|
| 295,910 | 8/1928 | Great Britain | 75/3 |

*Primary Examiner*—A. B. Curtis
*Attorney, Agent, or Firm*—Stevens, Davis, Miller & Mosher

[57] ABSTRACT

A method in roasting fine-grained sulphur-containing flotation concentrate in a furnace of the fluidized bed type, to provide for sufficient duration of stay and uniform distribution of the charged material in the bed, wherein the material is charged to the bed via a metering device, and is imparted sufficient material strength and correct grain size by being compressed between rolls, to prevent the material from being carried away before roasting of the same is substantially terminated.

7 Claims, 1 Drawing Figure

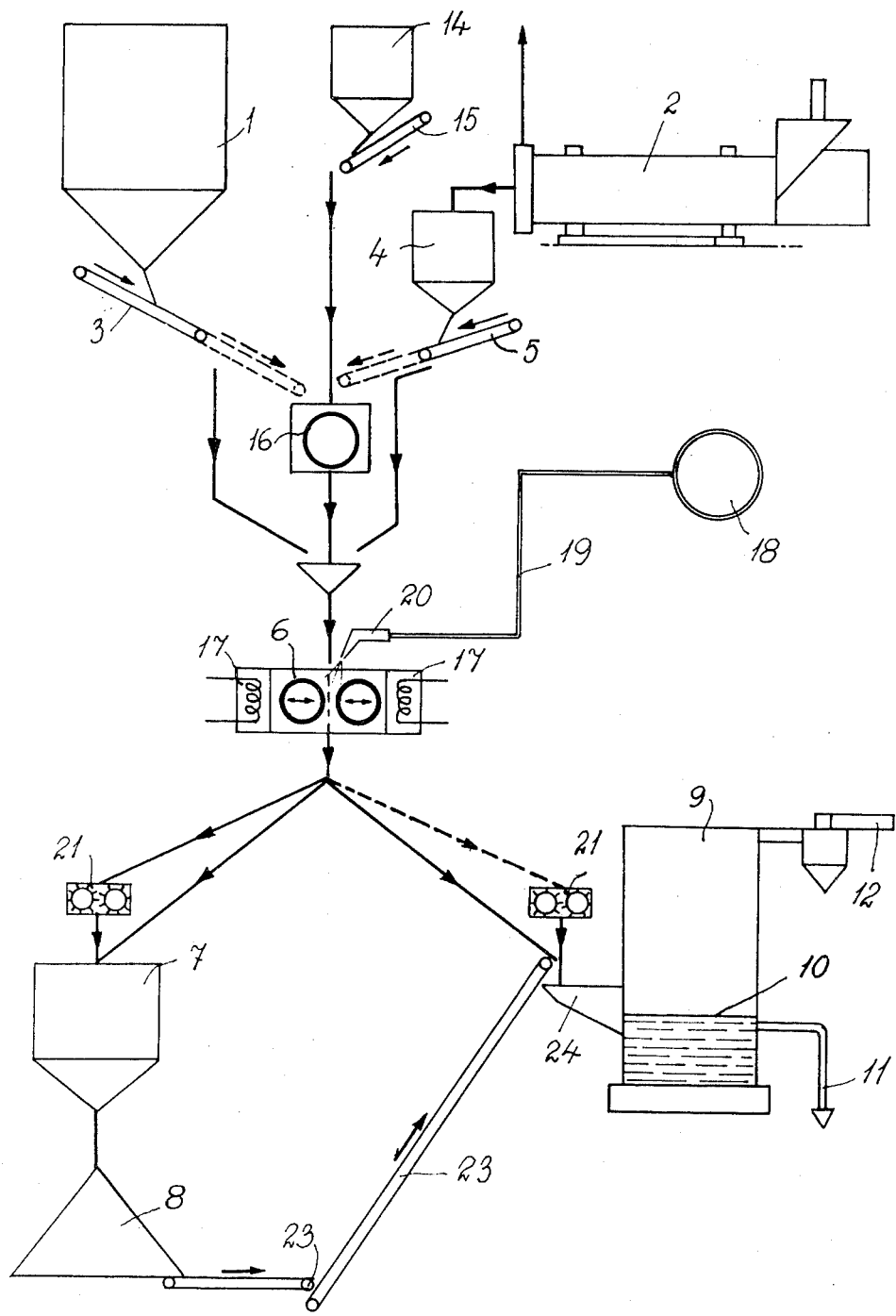

METHOD OF ROASTING FINE GRANULAR SULPHIDE MATERIAL IN FLUIDIZED BED FURNACES

This is a continuation of application Ser. No. 126,314, filed 3-19-71 (which is a continuation of Ser. No. 739,222, filed June 24, 1968, both now abandoned.

The introduction of so-called fluidized bed furnaces has practically revolutionized the roasting of granular sulphide material. These furnaces offer great advantages as opposed to prior art furnaces when roasting pyrites, for instance. However, the fluidized bed process has, from the outset, been directed more to the roasting of so-called fine concentrate, i.e. relatively coarse-grained material which has been crushed to a relatively fine material and/or is usually wet dressed. Pyrites, however, are being recovered in ever increasing amounts in the form of flotation dressed concentrate, which is much finer than fine pyrites. When roasting finely grained flotation concentrate in fluidized bed furnaces certain disadvantages become manifest, particularly when roasting according to the process BASF, which essentially stem from the difficulty of charging the concentrate so that the large majority of said concentrate is combusted in the fluidized bed, in which cooling means are arranged. When continuously charging fine flotation concentrate above the surface of the fluidized bed it is very difficult in the case of normal loads to prevent a large portion of the pyrites from being blown up into the furnace shaft without reaching the bed. Fine flotation concentrates are ignited practically instantaneously and the concentrate which does not flow down into the bed burns in the shaft above said bed resulting in troublesome over-plus temperatures arising in this portion of the furnace; i.e. temperatures which are higher than those desirable.

These over-plus temperatures restrict the capacity of the furnace. The capacity of the furnace per unit roasting area is thus 30 – 40% higher when roasting course-grain fine pyrite, for instance, than when roasting fine-grained flotation pyrite.

The portion of the pyrite which runs down into the bed is quickly combusted there and imparts its heat of combustion to cooling means present in the bed. To avoid the disadvantages associated with flotation pyrite attempts have been made to charge the concentrate from below the surface of the bed, although without particularly favourable results because of construction difficulties. Hence, when charging the pyrite there is an oxygen deficiency immediately adjacent the charging opening, owing to the fact that the flotation concentrate is burnt too rapidly. Attempts have also been made to charge the concentrate together with the fluidizing gas, but th problem of designing and arranging the neccessary apparatus has hindered the success of this solution.

Certain other possibilities of reducing the disadvantages with after-combustion of pyrite in the shaft above the bed have been suggested. For instance, the pyrite may be moistened before charged into the furnace so that small lumps are formed, which when being charged to the furnace sink down into the bed. However, moistened pyrite is difficult to meter and easily fastens in pockets and charging means. Further, the elevated moisture content gives rise to heat losses in furnaces fitted with heat regain means. In addition to the difficulties mentioned the water in the pyrite is rapidly vaporized, causing the weak agglomerate to disintergrate; whereby the same problems become manifest as those when charging untreated flotation pyrite.

Other suggestions of over coming the discussed disadvantages have included the pelletizing of concentrate before its introduction into the roasting furnace. Although this method of solving the problem with the roasting of flotation pyrite affords a certain improvement the pelletizing process involves a number of additional treatment steps. For instance, a by no means insignificant system is required. Also, the pelletizing process must be carefully superintended and, inter alia, the concentrate must be moistened to an accurately determined water content, and is generally dried after pelletizing. Application of the pelletizing process excludes the possibility of utilizing all materials since not all material can be pelletized without using special binding agents. Further, it is not possible to pelletize concentrates presenting uneven size distribution without grinding the same. Also, the mechanical strenght of dry pellets is very low unless the pellets are stored for long periods, while the use of moist pellets results in the same diadvantages as mentioned above with regard to moistened agglomerated material.

Consequently, none of the above mentioned methods utilize the volume of the bed to the fullest extent because of the uneven combustion taking place in different portions of the bed. In turn this means an uneven flow in the furnace shaft. The present invention provides a method which affords a considerable economic gain relative to prior known methods.

The problems presented above in association with the roasting of fine sulphur-containing flotation concentrate, primarily pyrite, in fluidized bed furnaces have been effectively solved by the invention. The new method of roasting the fine sulphide material resides in that the roasting process is supplemented with a stage in which the charge to the roasting furnace is subjected to a compressing treatment between two preferably smooth or grooved rolls so that said charge is introduced into the furnace in the form of an agglomerate. The method according to the invention is a completely surprising method which in a simple manner resolves the previously troublesome disadvantages manifest in fluidized bed roasting. It is most surprising that by effecting a simple rolling operation at a relatively low roll pressure a sufficiently strong agglomerate can be obtained for a roasting process of the type described. Despite the fact that it is previously known to agglomerate material by rolling it has not previously been suggested to utilize this method when roasting in fluidized bed furnaces, probably because of the erroneous supposition that high temperatures and high roll pressures would be necessary. Compression on rolling of the charge is effected in direct connection with the charging of the concentrate to the roasting furnace. Thus rolling is effected in connection with the roasting furnace, suitably by regulating the speed of the rolls, whereby said rolls can at the same time be used as a metering apparatus and at the same time an accurate metering to the furnace is obtained.

It is the experience of the inventors that the rolls should preferably be smooth so that a continuous cake is obtained. Also, wear on the rolls is slight.

When being rolled the flotation concentrate may be completely dry or moistened to some extent. In the course of practical experiments suitable charging products have been obtained on rolling which present a moisture content of the concentrate reaching 30% of the solid volume of the sulphide mass. The desired moisture content is obtained by adjusting the drying of the concentrate or by subsequent moistening of dry concentrate.

Prior art methods reveal that material to be agglomerated is supplied with various agents, intended to strengthen the cohesion between the particles. Materials which are used for this purpose are, for instance, elementary sulphur in powder form, sulphates of such metals as are included in the concentrate, mixtures of metal oxide and sulphuric acid and, with regard to pyrite concentrate, finely ground magnetic pyrites. Other binding agents are sulphite lye, sodium sulphate and bentonite.

Other materials may also be added to the concentrate. For instance, it has been found practical to add cinders to concentrate according to U.S. Pat. application Ser. No. 506381, and thereafter effect a rolling operation according to the present application.

When mixing elementary sulphur in the concentrate 1 – 2% by weight, but seldom more than 5% by weight, of finely ground sulphur is added to the concentrate before it is passed to the rolling stage; whereupon the concentrate is heated to the proximity of the melting point of the sulphur. Heating can be effected either by injecting superheated steam into the concentrate-sulphur-mixture during the rolling operation, or by electrothermically heating or induction heating of the concentrate in conjunction with the rolling operation. The method is particularly suited in such instances when the concentrate is taken direct from a dryer, whereupon it leaves the dryer with a temperature of between 50 and 100°C. The amount of heat required to raise the temperature of the concentrate-sulphur-mixture to around the melting point of sulphur is thus insignificant.

The concentrate is immediately cooled in air after it leaves the rolls, whereupon the sulphur solidifies and gives a mechanically strong and water tight aggregate, possessing splendid handling and roasting characteristics. The added elementary sulphur is recovered in conjunction with the recovery of the sulphur dioxide from the roasting furnace. Slightly moistened sulphates of the metal or metals included in the concentrate provide splendid additives for strengthening the cohesion between the particles. Such sulphates are suitably added in amounts up to 10% by weight of the quantity of concentrate. They are mixed in the slightly moistened concentrate prior to the rolling operation. During the compressing operation in the rolls the sulphate is rapidly dissolved followed by a crystallization immediately after the roll pressure is removed subsequent to rolling. The crystals which form as the pressure is released thus strengthen the cohesion between the particles. It is particularly suitable to produce and add the metal sulphate in the following manner: A greater or smaller amount of fine granular oxide, e.g. iron oxide, zinc oxide, lead oxide, falls from the roasting furnace. These are recovered separately and returned in desired quantities to the concentrate mass to be roasted. Prior to the oxide being mixed with the concentrate it is itself mixed with a quantity of sulphuric acid rising to maximally the stoichiometric amount necessary for reacting with the oxide. The mixing of oxide and sulphuric acid is done in accordance with a carefully adjusted time schedule. Such an oxide-acid-mixture, which is added to the concentrate in an amount of up to 10% by weight, usually 2 – 5% by weight, results in a very strong cohesion between the particles when the mixture is subjected to a rolling operation. If the time sequences are correctly chosen the reaction between oxide-sulphuric acid is effected to its termination at the moment when the concentrate mass-oxide-acid-mixture passes the pressure zone of the roll, whereupon an adjusted crystallization of sulphate between the particles is obtained at just the right moment, with resulting agglomeration.

In the event that sulphuric acid is produced by the roaster gases, and a portion thereof is obtained in the form of so-called black acid it is suitable to use such for the preparation of the oxide-acid-mixture.

When roasting pyrite concentrate it is, according to the invention, particularly suitable that magnetic pyrite, $Fe_9S_{10}$, is used in finely ground form as a cohesion strengthening agent. Complex ores containing pyrite often also contain magnetic pyrite, which can be extracted magnetically from the ore. Such magnetic pyrite in the form of a concentration can be added to the concentrate suitably before the rolling operation, in an amount of up to 10% by weight. The magnetic concentrate is subjected, if desired, to a prolonged fine grinding process, preferably to 100% less than 50 $\mu$m, the number of particles in the magnetic pyrite slurry and their surface area greatly increasing. A magnetic pyrite concentrate dewatered through filters is metered into the pyrite concentrate. This is suitable effected in a stage between the drying and rolling stages of the sulphide concentrate. The sulphide concentrate then arrives at a temperature of between 50° and 100°C. The temperature is lowered somewhat when the magnetic pyrite is added. However, the temperature is sufficiently high that the pyrite concentrate very rapidly agglomerates upon rolling, whereupon the magnetic pyrite and the reaction products emanating from same greatly strong then the cohesion between the particles. The rolling stage in the roasting process according to the invention offers the advantages that the charged material to be roasted is distributed uniformly across the bed and that combustion is uniform over the whole roasting area. In this way it is possible when roasting according to the BASF-method to operate at the same furnace loads as with fine pyrite. The method according to the invention is particularly suitable for application in conjunction with the magnetite-yielding roasting according to U.S. application Ser. No. 506,381 filed Nov. 4, 1965, now U.S. Pat. No. 3,386,815, since in this roasting process it is of particular importance to obtain uniform roasting, and an excess of oxygen will completely impair the roasting result.

In certain instances agglomerates are obtained which vary greatly in size, or agglomerates which are too large. In such cases means are arranged between the rolling stage and the roasting stage for the purpose of breaking the agglomerates down to the desired particle size. A suitable arrangement for this object is a so-called spiked roller of known construction.

A preferred method of effecting the invention is described in the following with reference to accompanying drawing.

The concentrate intended for the roasting operation is stored in container 1 or is continuously advanced, in a dried or somewhat moistened state, from the drying drum 2. The concentrate is passed from these arrangements, via the feeder 3, from the container 1, or from the drying oven 2 via the equalizing container 4 and the feeder 5 to the press roll 6. The press roll comprises in principle a rolling machine presenting motor-driven double idler rolls which are urged together by a controllable force, usually hydraulically. The concentrate is fed vertically down between the rolls and compressed and agglomerated during its passage between the same. The roll pressure is normally selected between 0.5 and 5 ton/cm roll length. The motoring rate can be governed by regulating the speed at which the rolls rotate.

Upon completion of the rolling operation the agglomerated concentrate is collected in an equalizing pocket 7 or some other intermediate store 8, or is fed direct to the roasting furnace 9. Air is introduced to the furnace in a known manner and the sulphur content of the concentrate is roasted off in the fluidized bed in a manner known per se. The agglomerating of the concentrate means that the concentrate in the roasting furnace falls down into the bed 10 and is there roasted off. The roasted-off oxide 11 and the gas 12 are recovered in a normal manner in the roasting furnace.

In the event that binding agents are added these are stored intermediately in the container 14 and are charged to the concentrate by means of the feeder 15. The feeder 15 and the feeders 3 and 5 are connected by guides so that a constant predetermined weight proportion of additive agent is charged. The additive agents and the concentrate are treated in mixing apparatus 16 before the concentrate is passed to the rolling apparatus 6.

When adding elementary sulphur in order to to obtain a stronger agglomerate the concentrate is charged heated to a temperature in the proximity of the melting point of sulphur by resistance heating or by means of induction heaters 17 mounted to operate in the feeder roll or at its discharge portion. In the event that steam is used as the heating means super-heated steam is taken from the boiler 18 and passed, via the conduit 19, to the rolling apparatus and injected between the rolls of the same through nozzles 20. The steam heats the surface of the concentrate and causes the sulphur to melt for a very short period of time during the moment the concentrate passes the rolls.

In the event that the agglomerate is too coarse a spiked roll 21 is used to break the agglomerate down into the desired size. The spiked roll may be connected direct between rolling stage and roasting furnace, as shown in the FIGURE, but may also be included in another stage of the treatment schedule, between rolls and roasting furnace according to the alternative embodiment for rolling and roasting.

What is claimed is:

1. In a proces for roasting finely divided sulphide-containing flotation concentrates and other sulphide-containing products of similar extremely fine particle size in a furnace of the fluidized bed type wherein fluidizing gases are introduced in the lower portion of the bed and passed upwardly therethrough in effecting the roasting operation and finally depart the furnace via the furnace shaft together with the main part of the roasted product obtained during roasting, the improvement in the method of supplying the concentrates to said furnace which comprises adjusting the water content of the concentrates not to exceed 30 per cent of their solid volume, compacting said treated concentrates by passing them between substantially smooth surfaced rolls at a roll pressure less than 5 ton per cm roll length to obtain aggregates of suitable mechanical strength and size, and directly charging the aggregates into the fluidized bed, the aggregates after being compacted having obtained such mechanical strength and size that when charged will penetrate into the bed to a sufficient depth to have time when decrepitating to be uniformly distributed over the area of said bed and become substantially roasted before particle entrainment by the roaster gases leaving the furnace.

2. A method according to claim 1, characterized in that the sulphide-containg material is metered to the roll pair by means of meteringmeans connected to the furnace.

3. A method according to claim 1, characterized in that the material is metered to the furnace by means of rolls having variable speeds of rotation.

4. A method according to claim 1, characterized in that the material is heated by supplying super-heated steam during its advancement and/or passage between the rolls.

5. A method according to claim 1, characterised in that the sulphide-containing material is added to magnetic pyrites, which are mixed in the concentrate prior to the rolling operation.

6. A method according to claim 5, characterized in that the magnetic pyrite is added in a form of fine granular concentrate presenting a particle size substantially less than 50 $\mu$m.

7. A method according to claim 1, characterized in that the aggregate obtained by the rolling operation is disintergrated by means of a spiked roll, for instance, to form a smaller aggregate.

* * * * *